United States Patent [19]

Teichert et al.

[11] Patent Number: 6,033,469
[45] Date of Patent: Mar. 7, 2000

[54] INJECTION PREPARATION SUSPENSION FREE OF SODIUM BENTONITE

[75] Inventors: Horst-Dieter Teichert, Geisenheim; Reinhard Umlauf, Wiesbaden, both of Germany

[73] Assignee: Dyckerhuff AG, Wiesbaden, Germany

[21] Appl. No.: 09/025,884

[22] Filed: Feb. 18, 1998

Related U.S. Application Data

[63] Continuation-in-part of application No. 08/685,348, Jul. 24, 1996, abandoned.

[30] Foreign Application Priority Data

Jul. 25, 1995 [DE] Germany .......................... 195 27 135

[51] Int. Cl.$^7$ .................................................. C04B 24/10
[52] U.S. Cl. ..................... 106/804; 106/714; 106/729; 106/730; 106/802; 106/805; 106/819; 106/823
[58] Field of Search ..................................... 106/729, 730, 106/802, 804, 805, 819, 823, 714

[56] References Cited

U.S. PATENT DOCUMENTS

| | | | |
|---|---|---|---|
| 2,655,004 | 10/1953 | Wertz | 405/264 |
| 4,464,200 | 8/1984 | Duval | 106/708 |
| 4,662,943 | 5/1987 | Baker et al. | 166/293 |
| 4,997,487 | 3/1991 | Vinson et al. | 106/804 |
| 5,004,506 | 4/1991 | Allen et al. | 106/804 |
| 5,013,349 | 5/1991 | Tanaka | 71/27 |
| 5,154,771 | 10/1992 | Wada et al. | 106/730 |
| 5,180,430 | 1/1993 | Gartner et al. | 106/730 |

FOREIGN PATENT DOCUMENTS

| | | |
|---|---|---|
| 0 140 826 | 5/1985 | European Pat. Off. . |
| 0 142 116 | 5/1985 | European Pat. Off. . |
| 0 455 940 | 11/1991 | European Pat. Off. . |
| 0 505 096 | 9/1992 | European Pat. Off. . |
| 0 507 419 | 10/1992 | European Pat. Off. . |
| 0 554 751 | 8/1993 | European Pat. Off. . |
| 630 871 | 12/1994 | European Pat. Off. . |
| 0 631 994 | 1/1995 | European Pat. Off. . |
| 2 623 492 | 5/1989 | France . |
| 26 30 799 | 2/1977 | Germany . |
| 26 52 569 | 6/1977 | Germany . |
| 27 53 622 | 6/1978 | Germany . |
| 32 34 663 | 5/1983 | Germany . |
| 42 41 714 | 6/1984 | Germany . |
| 33 40 681 | 4/1985 | Germany . |
| 36 00 576 | 7/1987 | Germany . |
| 37 33 234 | 4/1989 | Germany . |
| 38 00 776 | 7/1989 | Germany . |
| 38 43 625 | 12/1989 | Germany . |
| 39 37 431 | 5/1991 | Germany . |
| 41 21 776 | 7/1991 | Germany . |
| 40 27 332 | 3/1992 | Germany . |
| 42 05 354 | 8/1993 | Germany . |
| 42 13 348 | 12/1993 | Germany . |
| 42 33 295 | 4/1994 | Germany . |
| 1105623 | 3/1968 | United Kingdom . |

*Primary Examiner*—Anthony Green
*Attorney, Agent, or Firm*—Jones & Askew, LLP

[57] ABSTRACT

Injection medium in the form of a dry mixture for preparing an injection suspension for sealing and/or reducing the penetrability of soils (loose rocks) and/or stone and/or structures against penetration by fluids, especially by water and gases, containing at least one mineral binder, especially a superfine binder, at least one stabilizer, at least one solvent and optionally other customary additives, such as at least one setting accelerator, an injection adjuvant and a water-retention agent, while the stabilizer is at least one organic thickener and the mixture additionally includes at least one essentially inert, superfine filler.

21 Claims, 2 Drawing Sheets

6,033,469

INJECTION PREPARATION SUSPENSION FREE OF SODIUM BENTONITE

CROSS-REFERENCE TO RELATED APPLICATION

This is a contnuation-in-part of application Ser. No. 08/685,348 having a filing date of Jul. 24, 1996 now abandoned.

BACKGROUND OF INVENTION

The invention pertains to a suspension of an injection preparation for sealing and/or decreasing the penetrability of soil (loose rock) and/or solid rock and/or construction sites to penetration by fluids, especially water or gases. The invention is especially useful for sealing the bottom of sandy subsoil in excavations or for the sealing of fissures or cracks in solid rock.

In civil engineering projects in sandy subsoil, the penetration of groundwater into excavations must be avoided. Generally, the groundwater inflow is intercepted by vertically surrounding the excavations with a sealed or narrow wall. The back pressure of the groundwater from the subsoil is interrupted by injections into the soil with injection solutions or injection suspensions wherein the injection is done according to a certain pattern.

The solids of the injection preparation suspension should have a particle size that allows them to penetrate into the smallest cavities. Moreover, the injection preparation suspension must assure that after a socalled maturing time, the penetration of water into the injected sediment is at least extensively and adequately reduced. The environment must not be endangered as a result of the injected materials. The injection process must be easy and economical to execute.

It is known to use injection solutions in the form of socalled "soft gels" or ultrafine cement suspensions.

Soft gels consist of solutions of water glass and a hardener component. The disadvantage with these is that the solution must be injected within a very short period of time after addition of the hardener because otherwise reactions occur that increase the viscosity of the injection suspension in such a manner that the injection cannot be done. In addition, disposal of the remainder of the suspension is problematic. Moreover, a very significant disadvantage is the undesirable permanent introduction of alkalis to the groundwater. For this reason, demands are already being made to exclude such soft gels from injection solutions.

Ultrafine cement suspensions consist of aqueous slurries of ultrafine cement with a very high degree of fineness to which sodium bentonite is usually added for stabilization. The ultrafine cement suspensions can be handled easily and are not hazardous. Ultrafine cements usually consist of ultrafine powdered metallurgical slag (blast furnace slag) and activators and/or portland cements which, after addition of water, temporarily have an alkaline reaction as a result of their hydration, with the liberation of $Ca(OH)_2$. The $Ca(OH)_2$ reacts with the $CO_2$ of the groundwater to produce lime. In this respect, the injection process with ultrafine cement suspensions protects the environment.

Sodium bentonite is a clay that is capable of strong swelling which disintegrates into very small particles in aqueous suspension. The ultrafine sodium bentonite particles in a quiescent state impart a flow limit to suspensions that prevents the solid components from sedimenting. In the presence of hydrating cement, sodium bentonites tend towards a charge reversal of the ions, with undesired agglomeration as a consequence; the high degree of fineness of the starting components can therefore not be fully exploited. Moreover, the storage stability of sodium bentonitecement mixtures is very limited.

An additional disadvantage of sodium bentonitestabilized ultrafine cement suspensions is that the desired effect of the injection is impaired in saltcontaining soils. In addition, there is the fact that sodium bentoniteultrafine cement suspensions with high waterbinder values tend to leach into the subsoil, which can generally only be avoided if the proportion of sodium bentonite is substantially increased. However, with an increase in the proportion of sodium bentonite, the danger of agglomeration also increases.

U.S. Pat. No. 4,662,943 describes a mixture containing cement, at least one salt, and at least one polysaccharide or a mixture of polysaccharides that has a dissolution time of greater than 10 min. This binder mixture serves as a backfilling mixture based on a deepwell cement. The deepwell cement used in this is a Class H deepwell cement (as per API) with a normal degree of fineness that is stabilized with polysaccharides and salts. The mixture of U.S. Pat. No. 4,662,943 contains no inert mineral filler. However, according to the patent, heavy additives are proposed as fillers such as, e.g., hematite, ilmenite, quartz powder, and sand. These additives have the task of making the binder mixture heavier, i.e., to increase the bulk density as well as to act as blenders. The salt addition produces a certain property, the socalled "inverse rheology," i.e., that the viscosity of the suspension increases with increasing temperature.

U.S. Pat. No. 2,655,004 pertains to a mixture and a process for reinforcing and solidifying porous earth work, stone masonry work, construction concrete, etc. According to U.S. Pat. No. 2,655,044, an improved hardenable, cementcontaining mixture is formed that can be pressed into the cavities and fissures of a porous or holefilled concrete mass under pressure. An injection suspension as per this document contains hydraulic cement of normal particle size, water, and a small proportion of dispersant, wherein the dispersant is indicated as being cellulose ether. According to the description, inert fillers can additionally be present in the mixture.

EP 0,631,994 Al describes an injection suspension based on ultrafine binder and ultrafine filler, wherein hydroxyethylcellulose is used as a dispersant. Such a binder suspension has a waterbinder ratio of 0.672.3 for ultrafine binders and 0.335 for normal cements. According to this document, mica, talc, kaolin, calcite, feldspar, dolomite, silica, or titanium or aluminum oxide can be used as ultrafine fillers.

It is the goal of the invention to produce an injection preparation suspension with at least one binder that can be handled easily and assures optimal sealing or decreasing of the penetrability, wherein the injection preparation suspension has an increased stability towards sedimentation even at high watersolids values. This goal is attained by an injection preparation suspension as disclosed herein.

SUMMARY OF INVENTION

The injection preparation suspension of the invention is free of sodium bentonite and has a low solids content. It contains as essential base components binders, especially ultrafine binders, flow agents, an essentially inert, finely particulate, frameworkforming filler, and a least one organic thickener, e.g., at least one polysaccharide, that acts as a sealing agent and stabilizer. Inert in the sense of the invention means that the filler does not react or reacts only insubstantially or is slow to react. It can have a slight hydraulic or pozzolanic activity.

The fineness of the ultrafine binder is known. The polysaccharides are described, e.g., in Ulmann's Enzyklopäidie der technischen Chemie [Encyclopedia of Applied Chemistry], 4th newly revised and expanded edition, Vol. 19, pp. 233 ff. Especially suitable stabilizers are biopolymers based on xanthan gum or Welan gum. The effect of these substances, especially the polymer based on Welan gum or Welan gum itself or synthetic polymer thickeners such as, e.g., those based on acrylic acid, can be reinforced by synergistic effects with other natural thickeners such as, e.g., galactomannans such as guar or carob powder.

However, starch and cellulose ethers are not suitable as organic thickeners since in contrast to the stabilizers of the invention, these act only as thickeners, i.e., the stabilizing effect of these substances depends on a thickening that is undesired for the injection suspension. The penetrating and injection behavior are negatively affected by this. The stabilizers of the invention have an extremely structural viscous flow behavior, that is, they have a high apparent viscosity only in the quiescent injection suspension.

From DE 4,339,386 Al, sodium bentonite liquid media for drilling and backfilling fluid of seismic shallow drillings are known that, besides bentonite and cement, additionally contain selected polysaccharides. The sedimentation behavior and filter cake formation are improved by the polysaccharide. In addition, injection suspensions of cement and water are known that contain a polysaccharide in combination with a superplasticizer ("Applications of Rheological Modifiers and Superplasticizers in Cementitious Systems," C. B. Skaggs, W. G. Rakitsky, and S. F. Whitaker, Superplasticizers and Other Chemical Admixtures in Concrete, Proceedings of the 4th CANMET/ACI International Conference, Montreal, Canada, October 1994). In the known mixtures, in the first case, only a sealing filter cake is formed as intended, and in the other case, sealing is described as being only by the binder itself. The interaction of the inventive components is therefore not taken into account. According to the present invention, this succeeds only due to the use of ultrafine binders in combination with ultrafine fillers and polysaccharides wherein the mixture must be free of sodium bentonite.

The suspensions of the invention resist sedimentation and can be used over long periods of time, even in saltcontaining soils, without being impaired. The high degree of fineness of the components, especially in using ultrafine binders, can be fully exploited. The formation of agglomerates by chemical or physicochemical changes in a component is excluded. A filtrate water loss as measured by the API RP 13B test is low. A filter cake is not formed. Surprisingly, in using a filler whose proportion of solids in the mixture is preferably greater than 50 wt %, the water penetrability value as per DIN 18130 of an injected sand layer remains drastically decreased.

What causes the special effect of the combination of the stabilizer with the solids system is not yet known. The solids of the suspension prepared with water/solids values of preferably greater than 5 are theoretically not capable of filling the relatively large interstices e.g., in sandy soils or the fissures in cracked solid rock. Quite probably, the combination of stabilizer/ultrafine filler and binder components, especially the ultrafine binder, forms a structure or framework in the pore space of the sand or between the edges of the fissures in the solid rock that is supported by the walls of the particles or fissures and divides the pore space into smaller pores in such a manner that the diffusion and penetration of water can be extensively prevented. The stabilizer has, among other things, the task of holding fast the solid components (filler and cement, especially ultrafine cement) within the cracks or within the interstices between the sand particles until crystals or crystallites of the silicate hydrates that grow radially (outward) from the cement particles into the space permanently link the filler particles with one another and connect to the walls of the space.

As ultrafine fillers, claycontaining mineral powder and clay powder can be used insofar as the clay components behave in an essentially inert manner to calcium ions, as do, e.g., for calcium bentonitic, kaolinitic, and illitic clays. By contrast to sodium bentonite, which has the role of a stabilizer, calcium bentonite, illite and kaolinite do not contribute to carrying the suspension or only insubstantially so at high watersolids values. They also do not substantially contribute to strength development for which reason they are used as "inert" ultrafine fillers in the sense of the invention.

Included among the ultrafine fillers are also, e.g., fly ash and/or certain slowreacting metallurgical slag (blast furnace slag) powders and/or certain mineral powders such as, e.g., trass or pumice or the like, which, although they make a slight contribution to the strength, it is negligible for the workability of the suspension.

The composition of the invention seals the pores, in combination with improved environmental compatibility compared to other substances, via a significant decrease in the liberated alkali and alkaline earth ions. The mixtures for preparation of an injection suspension of the invention essentially consist of:

A: 80-20 wt % of at least one hydraulic mineral binder
   20–80 wt % of an ultrafine inert mineral filler
   0.13 wt % flow agent (based on the sum of binder and ultrafine filler)
   0.052 wt % of a stabilizer from the group of polysaccharides, except starch and cellulose and their derivatives, (based on the sum of binder and ultrafine filler)
B: water in such amounts that a water/solids value of greater than 3.5 is obtained.

The sum of the components of injection preparation mixture A is 100 wt %.

Preferably an ultrafine cement, especially based on portland or metallurgical cement, is used as the binder. Mixtures of ultrafine cement and ultrafine powder of metallurgical slag (blast furnace slag) are also well suited. As the ultrafine filler, especially mineral powder, especially limestone powder, with a degree of fineness of 1 $\mu$m<x<90 $\mu$, preferably of 5 $\mu$m<x<24 $\mu$m, and more preferably of 5 $\mu$m<x<40 $\mu$m is used. Besides the ultrafine components of preferably 1–40 $\mu$m, substances of 40 to approximately 90 $\mu$m can also be used. The flow agent is preferably a sulfonated naphthaleneformaldehyde condensate (PNS), and as the accelerator, sodium sulfate. A preferred stabilizer is Welan gum.

To produce the suspension of the invention, the mixtures are prepared by intense mixing with water, wherein partial amounts can also be added later at the construction site as a compound. A water/solids value greater than 3.5 is always used, and a water/binder value greater than 7 is preferred.

After maturing time, the penetrability of the layer injected with the mixture of the invention is at least strongly decreased. The formulations of the invention have a very low solids content wherein a very high water/solids value of greater than 5 (corresponding to a water/binder value of preferably greater than 10) suffices for the requirements of sealing the bottom layer of sand or sandcontaining soil. The suspension is likewise suitable for injection into fissures in solid rock. The stability of the suspension is produced by the addition of the associative thickener (stabilizer). The fineness of the ultrafine binder and the ultrafine filler depends on the type of soil to be injected and is preferably in the range of greater than 5 μm and less than 24 μm particle size. As hydraulic hardening binders, the following can be considered:

a) latent hydraulic binder containing activator
b) natural or synthetic pozzolans (trass, calcined clay, calcined kaolin, or calcined mineral powder or fly ash or silica dust) with coreactants
c) alumina cements, portland cement, and cements with additives.

As ultrafine fillers, as already mentioned, claycontaining mineral powder and clay powder can also be used insofar as the clay components behave in an essentially inert manner to calcium ions, as do, e.g., calcium bentonitic, kaolinitic, and illitic clays. Injection aids can be dispersants such as naphthaleneformaldehyde condensate sulfonates or sodium polymethacrylate.

In the suspensions of the invention, apparently the crystals of the hydrated phases of the binder, especially the ultrafine binder, can expand freely into the space and develop into a type of framework arrangement together with the particles of the ultrafine filler, wherein polysaccharides aid this. This effect cannot be attained without addition of saccharides and essentially inert ultrafine fillers. With known cement or ultrafine cement/sodium bentonite mixtures, there is an accumulation of solid material at the particle surfaces of the sands or the surfaces of the fissures in the solid rock so that a substantial portion of the space between the sand particles or in the fissures remains free for the penetration of water. According to the invention, this space is not filled by the inert material because the amount of inert material does not suffice for this; rather, a matrix structure is formed that has a very fineporose matrix material in the cavities. This effect of the components could not be predicted. The invention can be implemented, as already indicated, both with binders, especially cements of both conventional fineness as well as with ultrafine binders or ultrafine cements because, according to the invention, what is important is to build up a framework structure in the spaces or pore spaces to be sealed that consists essentially of calcium silicate hydrate crystals and filler particles.

DETAILED DESCRIPTION OF PREFERRED EMBODIMENT

Figure 1:
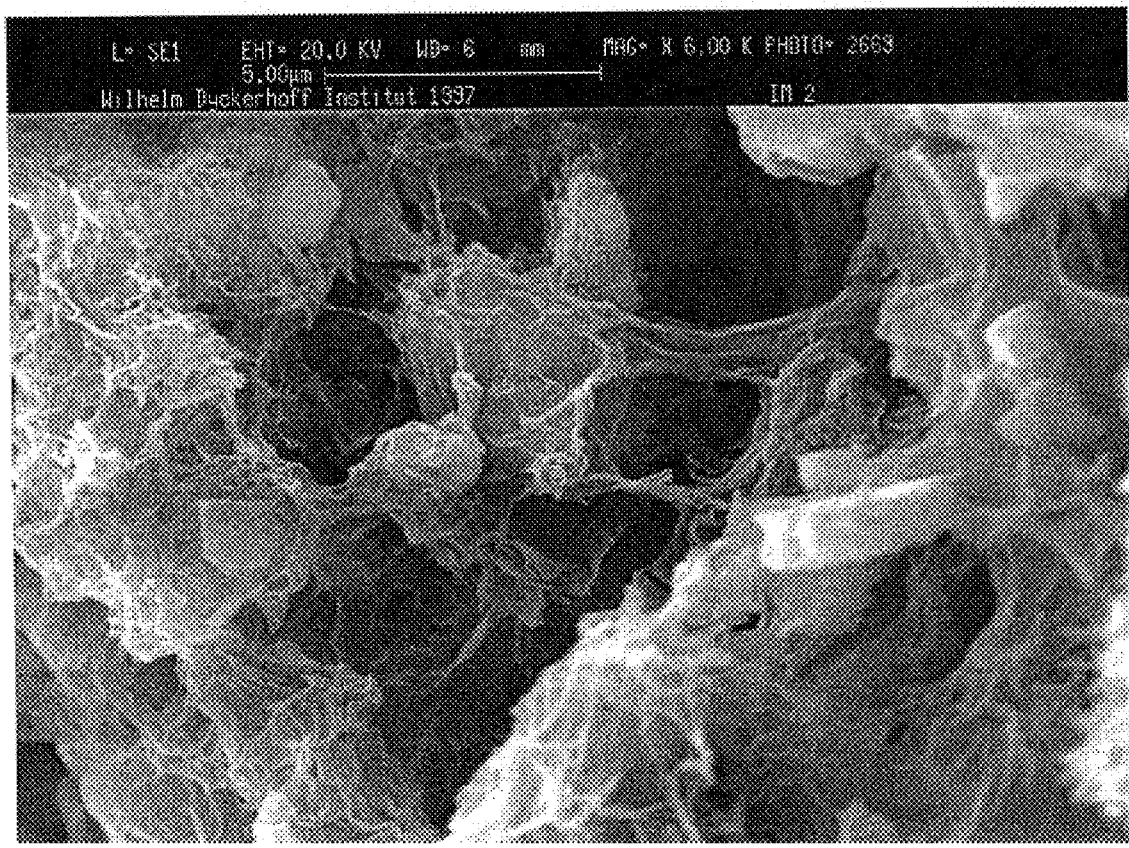
FIG. 1 is an electron microscope image showing a sand particle overgrown with hydration products.

The invention is described below on the basis of an example. In this, different injection suspensions were prepared in that binder mixtures were prepared with a predetermined amount of water.

A comparison is made of a standard ultrafine binder that was mixed with a small addition of additives to produce a standard ultrafine binder suspension and two injection preparations (IM 1 and IM 2) that were mixed with water to produce the injection preparation suspensions of the invention. The compositions of the suspensions are given at the head of the following tables in which the results of the comparison tests are also shown.

|  | Standard Ultrafine Binder (SFBM) | Injection Agent IM2 | Injection Agent IM1 |
|---|---|---|---|
| Formulation consisting of: | 93.6% SFBM<br>1.4% flow agent<br>1.7% stabilizer<br>3.3% hardening accelerator<br>Injection aid<br>Water retention agent | 46.8% SFBM<br>46.8% inert ultrafine filler<br>1.4% flow agent<br>1.7% stabilizer<br>3.3% hardening accelerator<br>Injection aid<br>Water retention agent | |
| Suspension properties | SFBM suspension | Injection agent suspension | Injection agent suspension |
| Water/solids ratio | 6 | 6 | 3 |
| Properties when freshly prepared | | | |
| Marsh time - immediately (sec) | 32 | 32 | 40 |
| Measure of settling | | | |
| After 2 hours (%) | 0 | 0 | 0 |
| After 24 hours (%) | 0 | 0 | 0 |
| Properties after hardening | | | |
| Uniaxial compression strength | | | |
| 7 d (N/mm2) | 2 | 1 | 1.5 |
| 28 d (N/mm2) | 4 | 2 | 3 |
| KF value after injection into test slag F31 | | | |
| After 7 days | $8 \cdot 10^{-5}$ | $5 \cdot 10^{-5} - 1 \cdot 0^{-7}$ | $5 \cdot 10^{-7} - 2 \cdot 10^{-8}$ |
| After 28 days | $3 \cdot 10^{-6}$ | $1 \cdot 10^{-7} - 1 \cdot 0^{-8}$ | $2 \cdot 10^{-7} - 2 \cdot 10^{-9}$ |

As can be seen from the tables, the watersolids value for the standard ultrafine binder in column 1 as well as the injection preparation (IM 2) is 6, whereas that of the injection preparation (IM 1) shown in the third column was mixed with water at a watersolids value of 3.

If the standard ultrafine binder is compared to an injection preparation (IM 2), one can determine that mixing the injection preparation with inert substances produces a decrease in the compressive strength. Usually one assumes that there is a direct relation between strength and the impenetrability of the injected substance. A comparison between injection preparation IM 2 and the standard ultrafine binder shows that the strength of the claimed mixture after 7 and 28 days is less than that of the pure binder. However, in the penetrability test, it behaves opposite to this. This behavior is due to the differing structural constitution.

A comparison of an injection preparation suspension with a watersolids value of 3 not corresponding to the invention (IM 1) with a watersolids value of 6 (IM 2) shows that upon decreasing the watersolids value, only a slight strength and sealing improvement is attained. This small improvement in sealing is attained with an inordinately high proportion of solids in the suspension. This improvement is not required at the construction site and is bought at the expense of clear economic as well as ecological disadvantages.

Compared to an injection preparation suspension with a low watersolids value (e.g., 3), the claimed injection preparation suspension has the following advantages:

better injectability adequate impenetrability lower materials cost, therefore less expensive better environmental compatibility (documented by the expert opinion of the Hygiene Institut Gelsenkirchen) due to lesser input of material into the ground and the advantageous pH.

As example, the invention is described below on the basis of two electron microscope images of hardened injected substances.

The increase of the compressive strength of an injected substance upon exchange of a part of the binder with inert filler was to be expected. The cause for the unexpected increase in the density was studied on the basis of the electron microscope images of the structure on a fourmont-hold injected substance.

FIG. 1 shows a view of a sand particle (right lower quadrant) that is completely overgrown with a dense bed of hydration products. A preparationcaused damaged spot in the lower right quadrant shows the original particle surface. Filmlike and fiberlike (left lower quadrant) hydration products extend from the sand particle to the likewise overgrown filler particles, the spherical objects in the middle of the image and at the left edge of the image.

Figure 2:
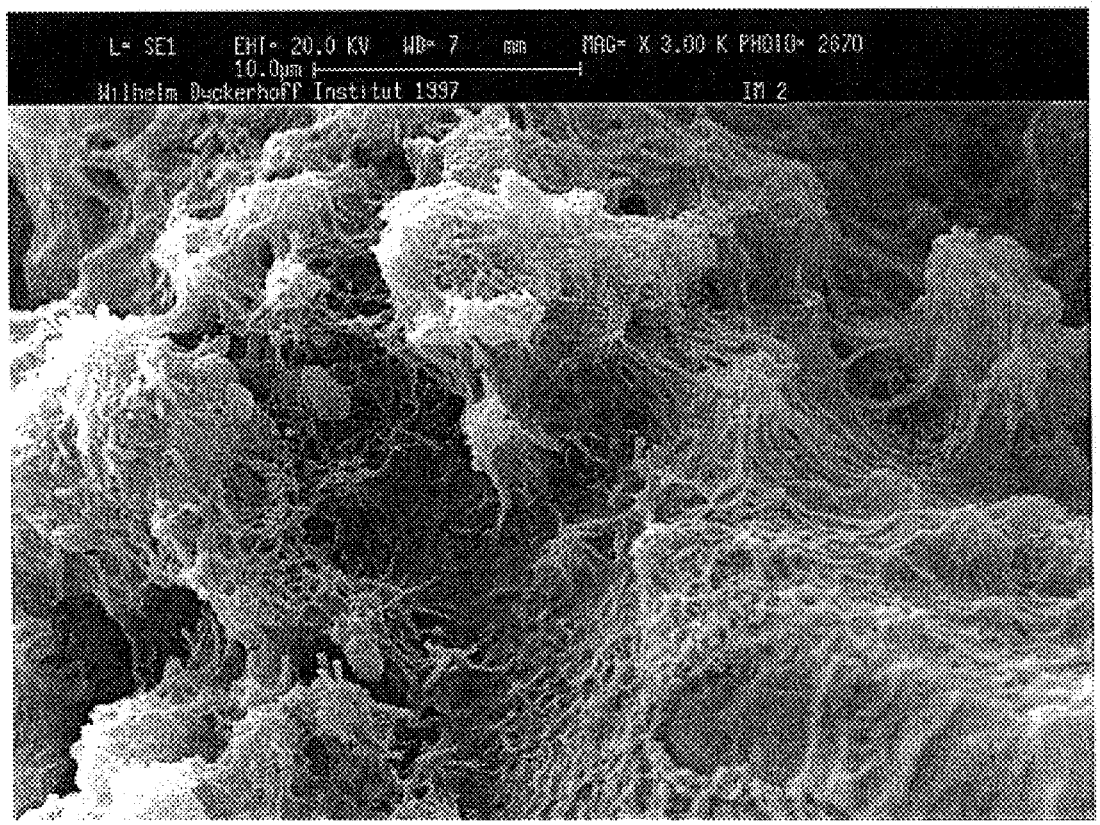
FIG. 2 is an electron microscope image showing the typical structure of filled interstices from a hardened injection suspension according to the present invention.

FIG. 2 shows the typical structure of filled interstices from a hardened injection suspension. In the middle of the image, a filler particle surrounded by a hydrated phase can be seen which is held in the middle of a pore by filmlike and fiberlike hydration products.

The structures shown in the figures could be formed because the filler and binder particles could be held "in suspension" until curing. This presupposes a high suspension stability and a high degree of dispersion of the filler and binder particles. During binding, the hydrated phases form bridges between the sand particles and the filler particles initiated by heterogeneous nucleus formation. Otherwise the hydrated phases would primarily attach themselves around the surfaces of the sand particles.

What resistance to flow the water encounters in penetrable spaces is decisive for the degree of effectiveness of sealing. FIG. 2 shows that in addition to the filler particles, primarily the hydrated phases formed in a fanlike shape between the filler and the sand inhibit the flow of water. During hydration, the binder increases its surface area by more than one thousandfold. What is essential for sealing is not the amount of hydrated phase alone, but primarily its arrangement within the structure which is imparted via the stability of the suspension and the inert filler.

What is claimed is:

1. Injection preparation suspension free of sodium bentonite, consisting essentially of:

(A) an injection preparation mixture consisting essentially of
   80-20 wt % of at least one hydraulic hardening mineral binder,
   20–80 wt % of an ultrafine inert mineral filler,
   0.1–3 wt % flow agent (based on the sum of the weights of binder and ultrafine filler), and
   0.05–2 wt % of a stabilizer selected from the group consisting of polysaccharides, except starch and cellulose and derivatives of starch and cellulose (based on the sum of the weights of binder and ultrafine filler); and (B) water to obtain a water/solids value greater than 3.5.

2. Injection preparation suspension as in claim 1, wherein the injection preparation mixture consists essentially of 70-30 wt % of at least one hydraulic mineral binder and 30–70 wt % of an ultrafine inert mineral filler.

3. Injection preparation suspension as in claim 2, wherein the injection preparation mixture consists essentially of 60-40 wt % of at least one hydraulic mineral binder and 40–60 wt % of an ultrafine inert mineral filler.

4. Injection preparation suspension as in claim 1 wherein the injection preparation mixture consists essentially of 0.2–1 wt % of a flow agent (based on the sum of the binder and ultrafine filler).

5. Injection preparation suspension as in claim 1, wherein the injection preparation mixture consists essentially of 0.2–1% wt % of a stabilizer from the group of polysaccharides, except starch and cellulose and its derivatives (based on the sum of binder and ultrafine filler).

6. Injection preparation suspension as in claim 1, wherein the injection preparation mixture further consists essentially of a hardening accelerator in amounts of 1–10 wt % (based on the weight of the ultrafine filler).

7. Injection preparation suspension as in claim 1, wherein the injection preparation mixture further consists essentially of a hardening accelerator in amounts of 2–6 wt % (based on the weight of the ultrafine filler).

8. Injection preparation suspension as in claim 1, wherein the binder is an ultrafine binder.

9. Injection preparation suspension as in claim 8, wherein the ultrafine binder is an ultrafine cement with a particle fineness of 1–40 $\mu$m.

10. Injection preparation suspension as in claim 8, wherein the ultrafine binder is a mixture of ultrafine cement and ultrafine powder of metallurgical slag.

11. Injection preparation suspension as in claim 1, wherein the ultrafine filler is a mixture of cement and metallurgical sand powder of conventional fineness of 40–90 $\mu$m.

12. Injection preparation suspension as in claim 1, wherein the ultrafine filler is a limestone powder.

13. Injection preparation suspension as in claim 1, wherein the particle fineness of the ultrafine filler is greater than 1 $\mu$m and less than 90 $\mu$m.

14. Injection preparation suspension as in claim 13, wherein the particle fineness of the ultrafine filler is greater than 5 $\mu$m and less than 24 $\mu$m.

15. Injection preparation suspension as in claim 1, wherein the polysaccharide is a biopolymer based on xanthan gum.

16. Injection preparation suspension as in claim 1, wherein the polysaccharide is a biopolymer based on Welan gum.

17. Injection preparation suspension as in claim 1, further consisting essentially of a thickening amount of guar or carob powder as natural thickeners.

18. Injection preparation suspension as in claim 1, further consisting essentially of at least one hardening accelerator or an injection aid or a water retention aid.

19. Injection preparation suspension as in claim 1, having a water/binder value greater than 7.

20. Injection preparation suspension as in claim 1, having a water/solids value greater than 5.

21. Injection preparation suspension as in claim 1 having a water/binder value greater than 10.

* * * * *

UNITED STATES PATENT AND TRADEMARK OFFICE
CERTIFICATE OF CORRECTION

PATENT NO. : 6,033,469
DATED : March 7, 2000
INVENTOR(S) : Teichert, et al.

It is certified that error appears in the above-identified patent and that said Letters Patent is hereby corrected as shown below:

On the title page, delete the name of the Assignee of "Dyckerhuff A.G." and replace therefor
- -Dyckerhoff A.G. - -

Signed and Sealed this

Eighth Day of May, 2001

Attest:

NICHOLAS P. GODICI

Attesting Officer     Acting Director of the United States Patent and Trademark Office